United States Patent [19]

Brull et al.

[11] Patent Number: 4,818,132

[45] Date of Patent: Apr. 4, 1989

[54] OPTICAL SENSOR PROTECTIVE MEMBER

[75] Inventors: Robert A. Brull, Dryden; Robert F. Bullivant, Interlaken; James R. Del Signore, II, Trumansburg; Alan H. Walker, Barton, all of N.Y.

[73] Assignee: NCR Corporation, Dayton, Ohio

[21] Appl. No.: 155,329

[22] Filed: Feb. 12, 1988

[51] Int. Cl.$^4$ ............................................. G01N 21/86
[52] U.S. Cl. ..................................... 400/708; 400/711; 250/561; 250/571
[58] Field of Search ................ 250/561, 571; 400/708, 400/711

[56] References Cited

U.S. PATENT DOCUMENTS

| | | | |
|---|---|---|---|
| 3,805,027 | 4/1974 | Azure | 235/61.11 |
| 3,824,401 | 7/1974 | Suzuki | 250/561 |
| 3,844,661 | 10/1974 | Birkett et al. | 356/184 |
| 4,074,217 | 2/1978 | Yanagawa | 355/30 |
| 4,696,246 | 9/1987 | Rohr et al. | 250/561 X |
| 4,697,089 | 9/1987 | Oraye | 250/561 |
| 4,727,399 | 2/1988 | Matsumoto | 250/571 X |
| 4,752,696 | 6/1988 | Matsushita et al. | 250/571 X |

*Primary Examiner*—Charles Pearson
*Assistant Examiner*—James R. McDaniel
*Attorney, Agent, or Firm*—Wilbert Hawk, Jr.; Albert L. Sessler, Jr.; George J. Muckenthaler

[57] ABSTRACT

A protective member in the form of an opaque brush operates as a non-reflective shield to an optical sensor while protecting such sensor against ambient light. The brush also provides for removal of contamination from the surface of the optical sensor as a slip or like document is inserted along a guide by causing the brush to swing across such surface.

18 Claims, 3 Drawing Sheets

OPTICAL SENSOR PROTECTIVE MEMBER

BACKGROUND OF THE INVENTION

In the field of printing, the most common type printer has been the printer which impacts against record media that is caused to be moved past a printing line or line of printing. As is well-known, the impact printing operation depends upon the movement of impact members, such as print hammers or wires or the like, which are typically moved by means of an electromechanical derived system and which system enables precise control of the impact members.

In the field of dot matrix printers, it has been quite common to provide a print head which has included therein a plurality of print wire actuators or solenoids arranged or grouped in a manner to drive the respective print wires a very short, precise distance from a rest or non-printing position to an impact or printing position. The print wires are generally either secured to or engaged by the solenoid plunger or armature which is caused to be moved such precise distance when the solenoid coil is energized and wherein the plunger or armature normally operates against the action of a return spring.

It has also been quite common to provide an arrangement or grouping of such solenoids in a circular configuration to take advantage of reduced space available in the manner of locating the print wires in that specific area between the solenoids and the front tip of the print head adjacent the record media. In this respect, the actuating ends of the print wires are positioned in accordance with the circular arrangement and the operating or working ends of the print wires are closely spaced in vertically-aligned manner adjacent the record media. The availability of narrow or compact actuators permits a narrower or smaller print head to be used and thereby reduces the width of the printer because of the reduced clearance at the ends of the print line. The print head can also be made shorter because the narrow actuators can be placed in side-by-side manner closer to the record media for a given amount of wire curvature.

In the wire matrix printer which is utilized for receipt and journal printing operation, the print head structure may be a multiple element type and horizontally disposed with the wire elements aligned in a vertical line and supported on a print head carriage which is caused to be moved or driven in a horizontal direction for printing in line manner across the receipt or journal paper and wherein the drive elements or transducers may be positioned in a circular configuration with the respective wires leading to the front tip of the print head. In the wire matrix printer which is utilized for business forms or like record media printing operation, the print head may be oriented in a manner wherein the nose is pointed downward for printing on the form, slip or like media while the carriage and print head are moved above and across the form or media in the horizontal direction.

Alternatively, the print head may be supported and guided along a line of printing wherein the form or record media is placed on edge and the print head is caused to be driven in a vertical direction for the printing operation.

In the case of a wire matrix printer which is utilized for form or slip printing, the difference in thickness of the form or slip may require some means or mechanism for adjusting the gap or the distance between the print head and the printer platen.

Additionally, in the case of a printer which is utilized for such form or slip printing, some means or mechanism is provided to detect the presence of a slip or form as the document is being inserted into position in the printer for the printing operation. A common mechanism for detecting presence of a slip or form is an optical sensing arrangement that bridges the path of the document and detects the presence thereof.

It is in the field of slip printers and the use of optical means for detecting the presence of a slip or like document that the subject matter of the present invention is most closely associated and which provides for improved and advantageous positioning and control of such slip or document during the printing operation.

Representation documentation in the field of sensing arrangements includes U.S. Pat. No. 3,805,027, issued to L. L. Azure on Apr. 16, 1974, which discloses automatic cleaning of a fiber optics probe wherein documents are transported in a path to effect wiping the sensing end of the fiber optics probe.

U.S. Pat. No. 3,824,401, issued to T. Suzuki on July 16, 1974, discloses a photoelectric type weft sensing process and a weft sensor for carrying out weft sensing work on looms in photoelectric manner wherein interception of light, emitted on one side of the warp sheet by the weft at the moment of picking motion, is sensed on the other side while cutting off luminous noise by the warp sheet. The absence of weft at the time of picking motion will interrupt the running loom.

U.S. Pat. No. 3,844,661, issued to C. B. Birkett et al. on Oct. 29, 1974, discloses a self-cleaning optical cell for a fluid analysis system wherein the cell is provided with a wiper blade assembly to wipe opposing cell surfaces in synchronized relation with measurement of selected photosensor wavelengths.

U.S. Pat. No. 4,074,217, issued to N. Yanagawa on Feb. 14, 1978, discloses a cleaning unit for an optical system of slit exposure type in which either a receptacle or the optical system is reciprocated for scanning an original. A lens face is automatically wiped by means of a soft material for each scan.

SUMMARY OF THE INVENTION

The present invention relates generally to impact type printers which have the capability of printing on record media or documents such as slips or forms. More particularly, the present invention relates to means for sensing a slip or form being inserted into position for printing thereon. The means for sensing the slip comprises an optical sensor of the reflective type that is positioned adjacent the path of travel of the slip which is directed in a path along a guide to the printing position.

Associated with and positioned in opposed manner to the optical sensor is a brush of opaque (light absorbing) material that acts as a non-reflective shield to the optical sensor and provides protection against ambient light during the time of non-insertion of a slip or form. Upon insertion of a slip or form across or past the optical sensor, the slip or form engages with the brush and causes the end of the brush to move along or across the surface of the optical sensor to clear or clean such surface of dust or other contamination which may have settled or accumulated thereon.

The brush is pivotally supported by means of a brush holder assembly and is maintained in a spring-loaded condition so as to be always urged or biased into contact with the surface of the optical sensor and to be easily moved by contact of the slip or form upon insertion thereof into printing position.

In view of the above discussion, a principal object of the present invention is to provide mechanism in a printer for protecting certain parts thereof against ambient light.

Another object of the present invention is to provide mechanism for removing contamination from certain parts of the printer.

An additional object of the present invention is to provide protective means in the form of an opaque member which prevents undesirable ambient light in a certain area of the printer.

A further object of the present invention is to provide means in the form of a sweeping or brushing member to assist in preventing contamination of certain parts of the printer.

Still another object of the present invention is to provide an optical sensor for use in detecting insertion of a slip or like document into printing position in a printer and means for protecting the optical sensor from false readings which may originate from ambient light.

Still an additional object of the present invention is to provide a brush which is supported in opposed manner relative to an optical sensor and which is caused to be moved across the surface of the optical sensor upon contact with the brush by a slip or like document upon insertion thereof into printing position and which brush removes contamination from such surface.

Still a further object of the present invention is to provide an opaque brush adjacent an optical sensor in a slip printer to shield against ambient light which may cause false readings, and which brush is swingably supported and is caused to be moved across the surface of the optical sensor upon insertion of a slip to remove contamination from such surface.

Additional advantages and features of the present invention will become apparent and fully understood from a reading of the following description taken together with the annexed drawing.

DESCRIPTION OF THE PREFERRED EMBODIMENT

Prior to describing the structure in detail, it should be noted that the printer with which the present invention is associated, and which is used in certain operations and/or environments, may be termed a slip or form printer for printing on documents of the slip or form type, which documents are normally inserted into the printer for the printing operations.

Figure 1:
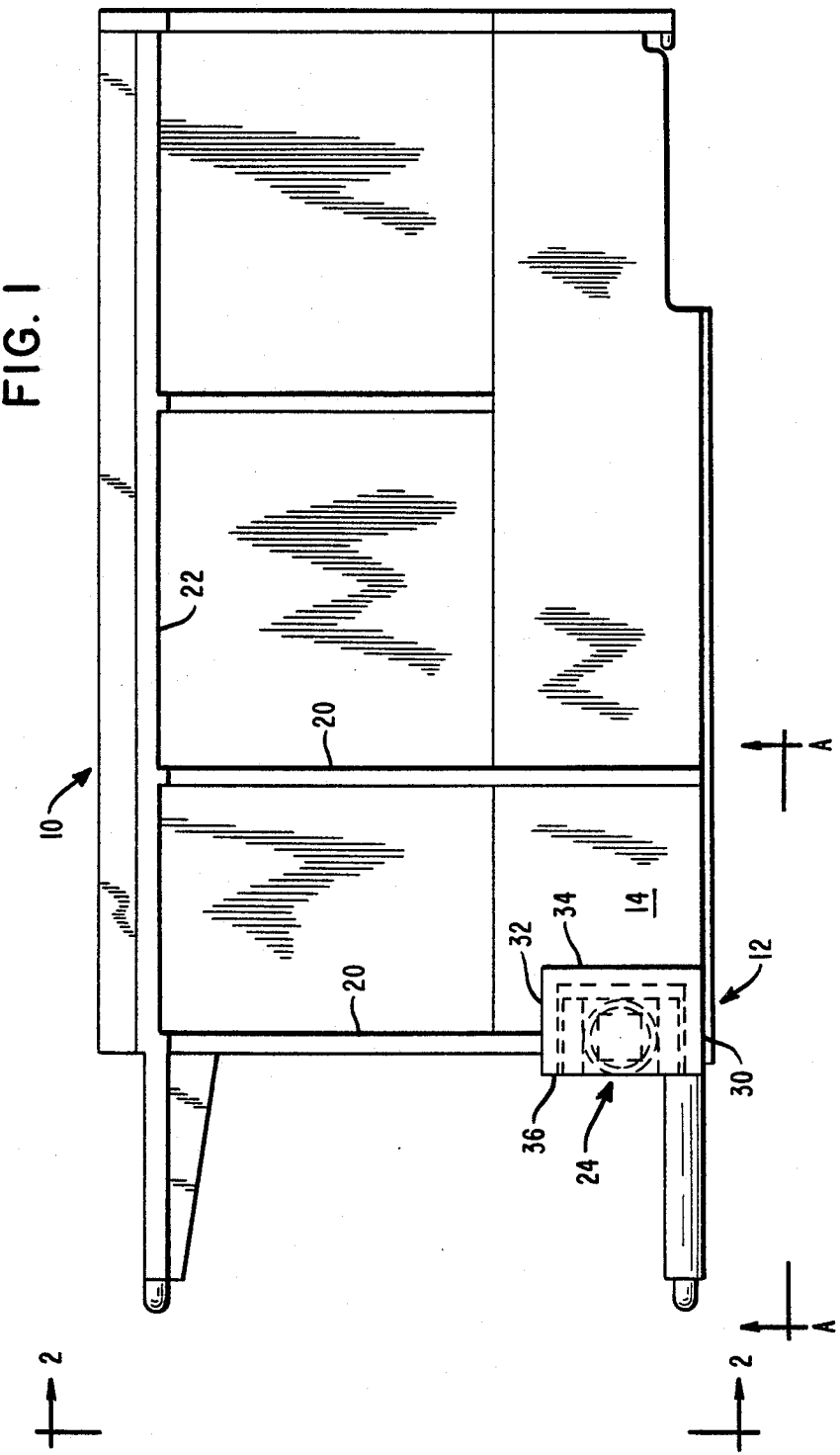
FIG. 1 is a plan view of a portion of the printer and showing the location of the optical sensor.
Figure 2:
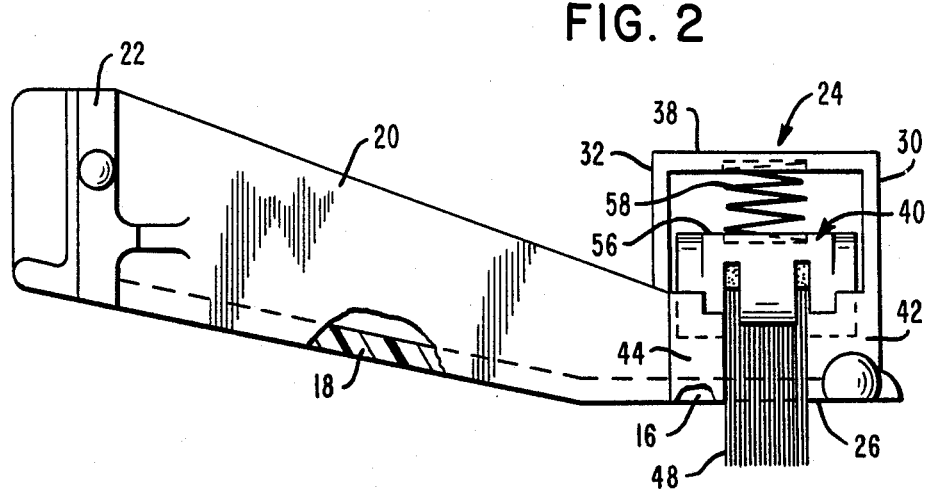
FIG. 2 is a view taken along the line 2—2 of FIG. 1.

Referring now to FIGS. 1 and 2, these constitute a plan view and an end view, respectively, of a guide 10 for a slip or like document, which guide is for use in a slip printer (not shown). The slip guide 10 is a molded plastic part of unitary construction and has a brush assembly, generally designated as 12, secured to the surface 14 of the guide 10 at one corner thereof. The guide 10 includes a first straight flat portion 16 and a second straight flat portion 18 disposed at an angle to portion 16. A plurality of ribs, as at 20, connect the portions 16 and 18 with an upstanding portion 22.

The brush assembly 12 is secured to the surface 14 of the first portion 16 and such assembly includes a housing 24 of generally rectangular shape which extends upwardly from the surface 14, the housing being generally perpendicular to the upper surface 14 and to a lower surface 26 of the portion 16. The surface 26 provides a path along and against which a slip or like document 28 (FIG. 4) is inserted for printing operation.

Figure 3:
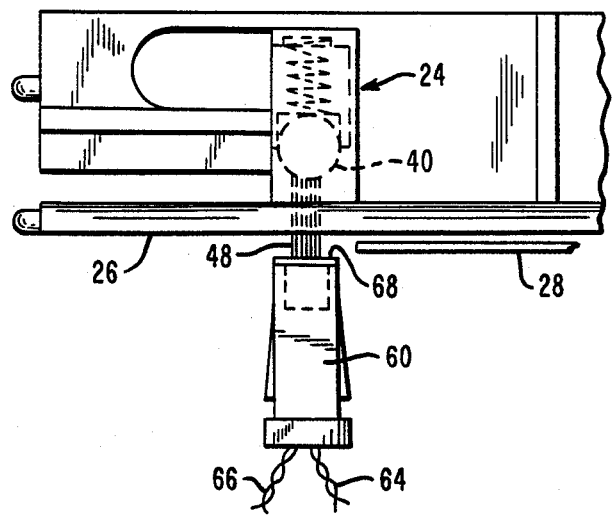
FIG. 3 is an elevational view of a portion of a printer incorporating the subject matter of the present invention and illustrating the parts in a nonoperating or dormant position.
Figure 4:
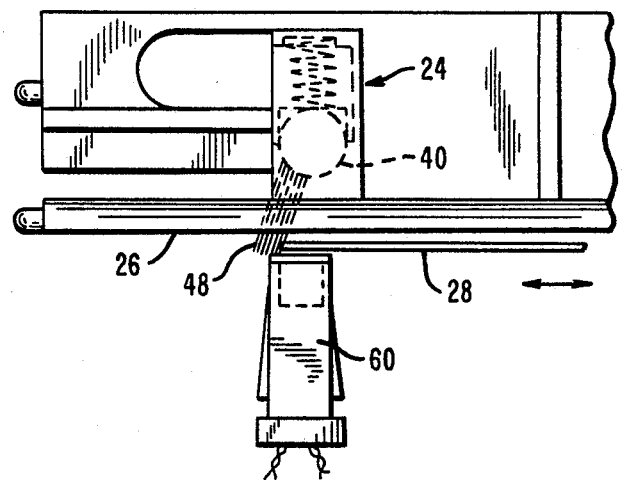
FIG. 4 is a similar view illustrating the parts in an operating position upon insertion of a slip or like document.

FIGS. 3 and 4 illustrate an elevational view taken in the direction A—A of FIG. 1. The housing 24 is preferably made of plastic material and includes side wall portions 30 and 32 (FIG. 2), a right side portion 34 (as viewed in FIG. 1) and an open left side portion 36. A cover 38 is secured to the top of the side wall portions 30 and 32 and to the top of the right side portion 34. The open left side portion 36 provides a window for access to a brush holder 40 which is pivotally supported in cradles 42 and 44 formed integral with the side wall portions 30 and 32.

Figure 5:
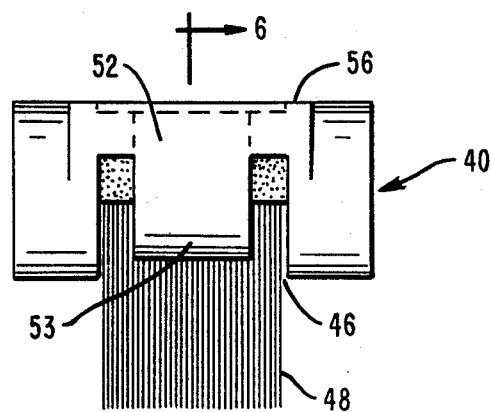
FIG. 5 is a view of the brush supported in dormant position.
Figure 6:
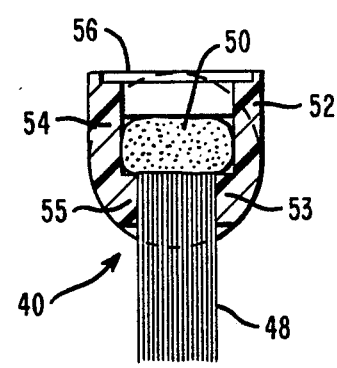
FIG. 6 is a view taken along the line 6—6 of FIG. 5.

The brush holder 40 is generally cylindrically shaped and includes an opening 46 through which extends a brush 48 of opaque nylon material. The brush 48 includes a cap portion 50 which is captured by side portions 52 and 54 of the brush holder 40. The side portions 52 and 54 include lugs 53 and 55, as illustrated in FIGS. 5 and 6, which engage the cap portion 50 and contain the brush in position in the brush holder 40. The brush holder 40 includes a flat surface portion 56 (FIG. 2) on the top thereof for receiving one end of a coil spring 58. The other end of the coil spring 58 engages the underside of the cover 38. The coil spring 58 urges or biases the brush holder 40 along with the brush 48 in a downward direction so as to maintain the brush holder 40 in contact with the cradles 42 and 44 of the housing 24.

FIGS. 3 and 4 show the positions of the brush holder 40, the brush 48, and an optical sensor 60 relative to an operation wherein the slip 28 or like document is inserted along the surface 26 of the guide 10. The optical sensor 60 contains both an illumination source and a detector element, and is available from TRW Optoelectronics Division and the brush is available from Schlegel Corporation. Suitable wiring, as at 64 and 66, is provided for the sensor 60, the operation of which is well-known in the optical sensing industry.

As the slip 28 is placed into position to be sensed by the sensor 60 (FIG. 3), the brush 48 is in contact with the surface 68 of the sensor in a manner wherein the brush protects the sensor 60 from ambient light, which, in some environments, may be sufficient to indicate that a slip is being inserted into position for a printing operation when, in fact, a slip is not present.

FIG. 4 shows the position of the slip 28 when engaging the brush 48 to cause the brush to be moved across or to sweep the surface 68 of the optical sensor 60. The brush 48, in effect, cleans the surface 68 of the sensor 60 so as to enable clear and accurate readings of the presence of the slip 28. The engagement of the slip 28 with the brush 48 causes the brush to be moved upwardly a slight amount while at the same time swinging in a clockwise direction, as seen in FIG. 4.

While the member 48 is described above as a brush of opaque nylon material, other structures may include a foam-like element of porous, plastic material or a web-like element of felt or cloth material. It is, of course, a requirement that the member 48 be made of opaque (light absorbing) material.

It is thus seen that herein shown and described is a record media sensing mechanism which provides for preventing false readings due to ambient light, for absorbing light from the illumination source at the time the slip or like document is not present for a printing operation, and for removing contamination from the surface of the sensor. The mechanism and arrangement enable the accomplishment of the objects and advantages mentioned above, and while a preferred embodiment of the invention has been disclosed herein, variations thereof may occur to those skilled in the art. It is contemplated that all such variations not departing from the spirit and scope of the invention hereof are to be construed in accordance with the following claims.

What is claimed is:

1. A protective member for use with a record member guide operably associated with optical sensing means for sensing presence of a record member, said protective member comprising a housing secured to the record member guide in position opposed to a surface of said optical sensing means, and sweep means supported in said housing and normally disposed in contact with said surface of said sensing means, said sensing means providing for optically sensing a record member upon insertion thereof along said record member guide, said sweep means substantially covering the surface of said optical sensing means to inhibit ambient light from said surface in the absence of a record member, and said sweep means moving across said surface when a record member is moved along said guide to engage said sweep means and thereby move said sweep means from contact with the surface of said optical sensing means to permit optically sensing of the presence of said record member.

2. The protective member of claim 1 including cradle means in said housing on which said sweep means is pivotally supported.

3. The protective member of claim 1 including means for biasing said sweep means into contact with said sensing means surface.

4. The protective member of claim 1 wherein said sweep means comprises a member of opaque material.

5. The protective member of claim 1 wherein said sensing means is an optical sensor positioned in relation to said record member guide and said sweep means is supported to contact the surface of said optical sensor and to sweep said surface upon engagement of said sweep means by said record member for cleaning said surface and to permit accurate indication of the presence of said record member.

6. The protective member of claim 1 wherein said sensing means comprises a reflective type optical sensor and said sweep means comprises a member of opaque material.

7. Apparatus for protecting optical sensing means for sensing the presence of a record member, said apparatus comprising a housing adjacent said optical sensing means, said optical sensing means having a surface across which said record member moves for sensing thereof, and sweep means supported in said housing and positioned to engage with and substantially cover the surface of said optical sensing means to prevent ambient light from impinging on said surface, said sweep means being engageable by said record member to cause said sweep means to move across and to clean said surface, the movement of said sweep means by said record member moving said sweep means from said surface and enabling said optical sensing means to sense the presence of said record member.

8. The apparatus of claim 7 including cradle means in said housing on which said sweep means is pivotally supported.

9. The apparatus of claim 7 including means for biasing said sweep means into contact with the surface of said sensing means.

10. The apparatus of claim 7 wherein said sweep means is an opaque brush.

11. In an assembly for sensing the presence of a record member, a housing and an optical sensor in opposed relationship thereto to form a passageway along which said record member is guided, the improvement comprising an opaque member supported from said housing and extending into said passageway and substantially covering a surface of said optical sensor to inhibit ambient light from reaching said surface, the movement of a record member along said passageway engaging said opaque member and causing said opaque member to sweep across the surface of the optical sensor for cleaning thereof and to be moved from contact with said surface by engagement of said opaque member with said record member for enabling sensing of said record member.

12. In the assembly of claim 11 wherein said opaque member is a brush pivotally supported from said housing.

13. The protective member of claim 1 wherein the biasing means comprises a spring.

14. The protective member of claim 1 wherein the sweep means comprises a brush of opaque material.

15. The apparatus of claim 7 wherein the biasing means comprises a spring.

16. The apparatus of claim 7 wherein the sensing means comprises a reflective type optical sensor and the sweep means comprises a brush of opaque material.

17. In the assembly of claim 11 including cradle means in said housing on which said opaque member is pivotally supported.

18. In the assembly of claim 11 including spring means for biasing said opaque member into contact with the surface of said optical sensor.

* * * * *